United States Patent [19]

Golden

[11] Patent Number: 5,163,044
[45] Date of Patent: Nov. 10, 1992

[54] USE OF A FRACTIONALLY SPACED EQUALIZER TO PERFORM ECHO CANCELLATION IN A FULL-DUPLEX MODEM

[75] Inventor: Glenn D. Golden, Tinton Falls, N.J.

[73] Assignee: AT&T Bell Laboratories, Murray Hill, N.J.

[21] Appl. No.: 636,821

[22] Filed: Jan. 2, 1991

[51] Int. Cl.$^5$ ............................................. H04B 3/23
[52] U.S. Cl. .................................. 370/32.1; 379/410; 379/411
[58] Field of Search ...................... 370/6, 24, 32, 32.1; 375/14, 58, 60; 379/406, 410, 411

[56] References Cited

U.S. PATENT DOCUMENTS

| | | | |
|---|---|---|---|
| 4,464,545 | 8/1984 | Werner | 370/32.1 |
| 4,535,206 | 8/1985 | Falconer | 370/32.1 |
| 4,742,510 | 5/1988 | Quatieri, Jr. et al. | 379/410 |
| 4,813,073 | 3/1989 | Ling | 379/410 |
| 4,924,492 | 5/1990 | Gitlin et al. | 370/32.1 |

Primary Examiner—Benedict V. Safourek
Assistant Examiner—Alpus H. Hsu
Attorney, Agent, or Firm—Ronald D. Slusky

[57] ABSTRACT

A new receiver structure is disclosed for a full-duplex modem in which a fractionally spaced equalizer, which is normally present to mitigate the effects of linear impairments present on a communication channel, also performs echo cancellation. Specifically, an additional echo signal is formed in the full-duplex modem and added to a received signal, which includes an echo signal, thereby forming a composite signal. This composite signal is then applied to the fractionally spaced equalizer for equalization, which mitigates the echo signal.

30 Claims, 8 Drawing Sheets

USE OF A FRACTIONALLY SPACED EQUALIZER TO PERFORM ECHO CANCELLATION IN A FULL-DUPLEX MODEM

BACKGROUND OF THE INVENTION

The present invention relates to echo cancellation techniques which are used in full-duplex data communication systems.

In the field of data communications, it is often advantageous for data traffic to be carried over a single communication channel in both directions simultaneously. Such simultaneous, two-way transmission is known as 'full-duplex' operation. A dialed telephone connection within the Public Switched Telephone Network (PSTN) represents a typical medium over which full duplex data transmission, using modems, is both desirable and common, despite the fact that the network was designed for voice conversations.

One problem attendant to exploiting the PSTN for full-duplex data transmission involves the fact that a portion of the PSTN channel (from the telephone central office to each customer's site) consists of a single twisted pair or "loop", rather than two separate transmission media, one dedicated to each direction of transmission. In order to accommodate full-duplex operation, signal energies from both directions of transmission must be superimposed on this single loop simultaneously. On the other hand, within the equipment terminating the loops (i.e., within the modems and at the central office) it is necessary for the signal energies from each direction to be separated from each other. Separation of the two signals from the loop is accomplished by the use of so-called "hybrid balance networks" (or just "hybrids") within the terminating equipment at each end of the loop.

Ideally, the hybrids completely decouple the two superimposed signals within the loop, making it appear as though there were separate end-to-end transmit and receive loops, one for each direction of transmission. In practice, the hybrids do not achieve perfect separation, and some signal energy from each direction of transmission inevitably leaks through to the opposite direction path. Such cross-path leakage allows some of the modem's transmitted signal to appear at the input of its own receiver. This undesired leaked-through signal is often referred to as "echo". Typical hybrid leakage levels result in echo sufficient to seriously degrade a modem receiver's performance if not mitigated.

One way of avoiding the echo problem is to design full-duplex PSTN modems which transmit and receive using different frequency bands, effectively placing the echo energy outside the passband of the receiver. However, in order to maximize data rate versus performance, it is highly desirable to utilize the full channel bandwidth in both directions. Although the echo cannot simply be filtered out in this case, it can be reduced to acceptable levels through the use of an adaptive "echo canceller" within the modem. The echo canceller adaptively synthesizes a replica of the echo, which is then subtracted from the received signal, leaving a substantially echo-free signal. This echo-compensated signal is applied to the modem's data receiver, which typically includes an adaptive equalizer to mitigate the effects of linear impairments present on the channel.

Other techniques to facilitate full-bandwidth full-duplex operation are also possible, including the use of adaptive hybrid balance networks to reduce the leakage energy. However, the echo canceller technique has been so successful that is now is a standard component in most full-duplex high-speed PSTN modems.

SUMMARY OF THE INVENTION

As seen from the above prior art description, echo cancellers have become a ubiquitous component in full-duplex modems intended for media such as the PSTN channel. In addition, as mentioned above, many modems utilize an equalizer to mitigate the effects of linear impairments that are present on the channel. Specifically, many full-duplex modem receivers utilize a "fractionally spaced equalizer" (FSE).

In accordance with the invention, I have realized a method and apparatus which uses a fractionally spaced equalizer and conditions an input signal in such a way that the fractionally spaced equalizer mitigates an echo signal without the need for a separate echo canceller.

This method and apparatus take advantage of the fact that certain types of of interfering signals, namely synchronous "cyclostationary" signals, can be mitigated very effectively by the fractionally spaced equalizer, provided that certain relationships exist between the spectra of the interfering signal and the desired signal to be equalized. While it is well known in the prior art that the echo signal is, nominally, a synchronous cyclostationary signal, the necessary spectral relationships do not exist between the echo signal and the desired signal, the latter in this case being the signal transmitted by the far-end modem. However, in accordance with the principles of the invention, the required spectral relationships are produced by adding to the fractionally spaced equalizer's input signal an additional echo signal, outside the frequency range of the fractionally spaced equalizer's input signal, to form a composite signal, and by increasing the bandwidth of the fractionally spaced equalizer to allow equalization of the composite signal. Thus, a new receiver structure is proposed which allows the fractionally spaced equalizer to simultaneously perform both equalization and echo cancellation.

DETAILED DESCRIPTION

Figure 1:
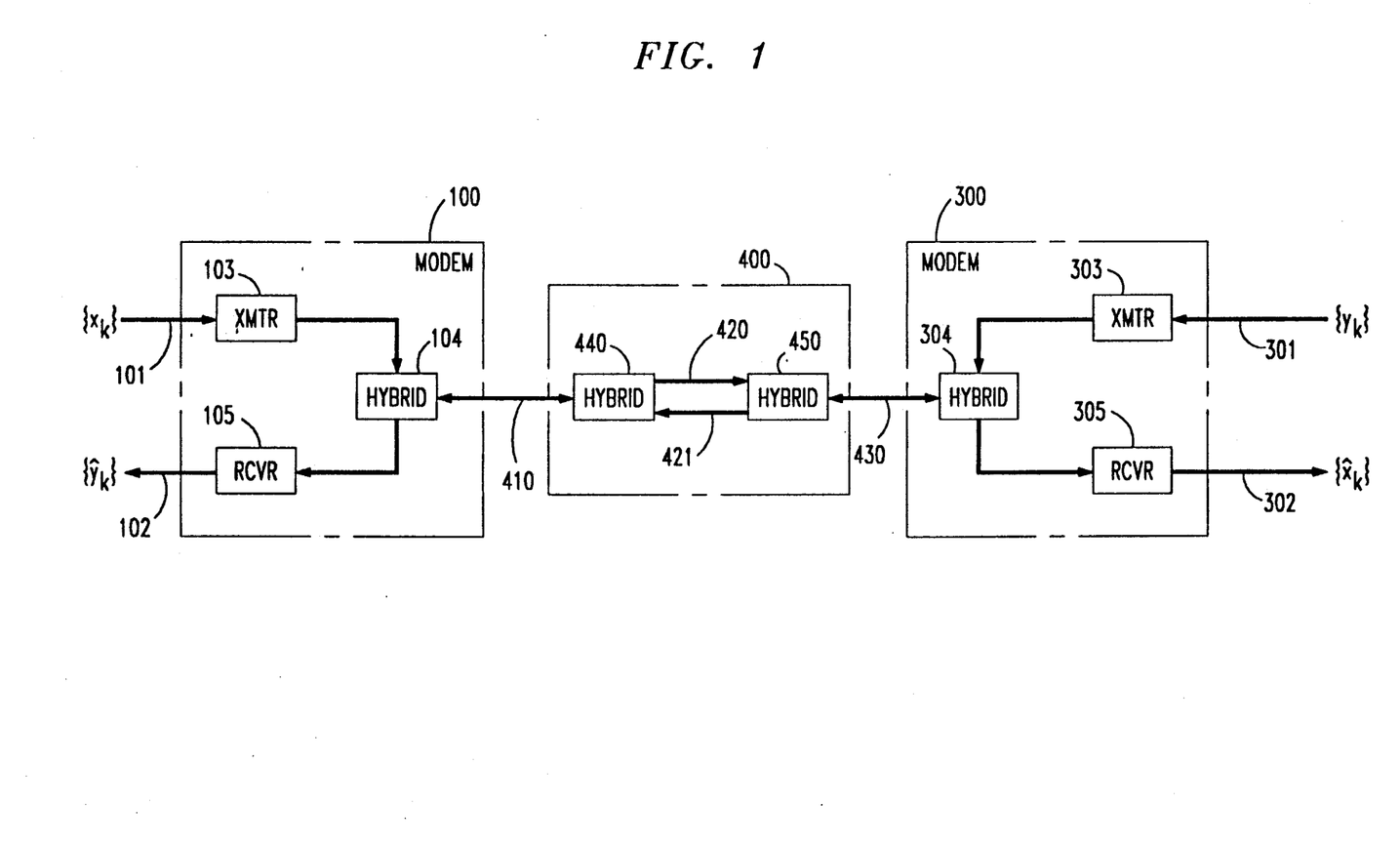
FIG. 1 is a block diagram of a full-duplex communication system, illustrating the general principles of full-duplex transmission over a PSTN channel.

FIG. 1. shows an illustrative full-duplex communication system employing modems to communicate data over a PSTN channel. Modems 100 and 300 both utilize the same frequency band to simultaneously transmit and receive signals, which are representative of their respective input data sequences $\{x_k\}$, $\{y_k\}$, over channel 400.

Illustratively, modems 100 and 300 employ quadrature amplitude modulation (QAM).

Channel 400 consists of bidirectional, "two-wire" customer loops 410 and 430 coupled to unidirectional transmission paths 420 and 421, through hybrids 440 and 450. Two-wire loops 410 and 430 are physical pairs of wire, which carry both directions of transmission simultaneously. Unidirectional paths 420, 421 may or may not be physical wire pairs, but in any case comprise what is commonly referred as a "four-wire" path—in essence, dual two-wire paths, each dedicated to one direction of transmission. Hybrids 440 and 450 perform the "four-wire to two-wire conversion" functions, splitting and combining the signals for each direction of transmission at the junctions between the two-wire loops and the four-wire transmission facilities. Two-wire loops 410 and 430 interface to modems 100 and 300, which in turn contain hybrids 104 and 304 to perform the directional splitting/combining functions within the modems.

Modems 100 and 300 both process their received signals to substantially mitigate the effects of echo and other channel impairments, so that ideally the output data sequences $\{\hat{y}_k\}$ and $\{\hat{x}_k\}$ are identical to input data sequences $\{y_k\}$ and $\{x_k\}$ respectively. In addition, for simplicity, both modems 100 and 300 are assumed to be identical in terms of their structure and operation, therefore only modem 100 will be described in detail hereinbelow.

Figure 2:
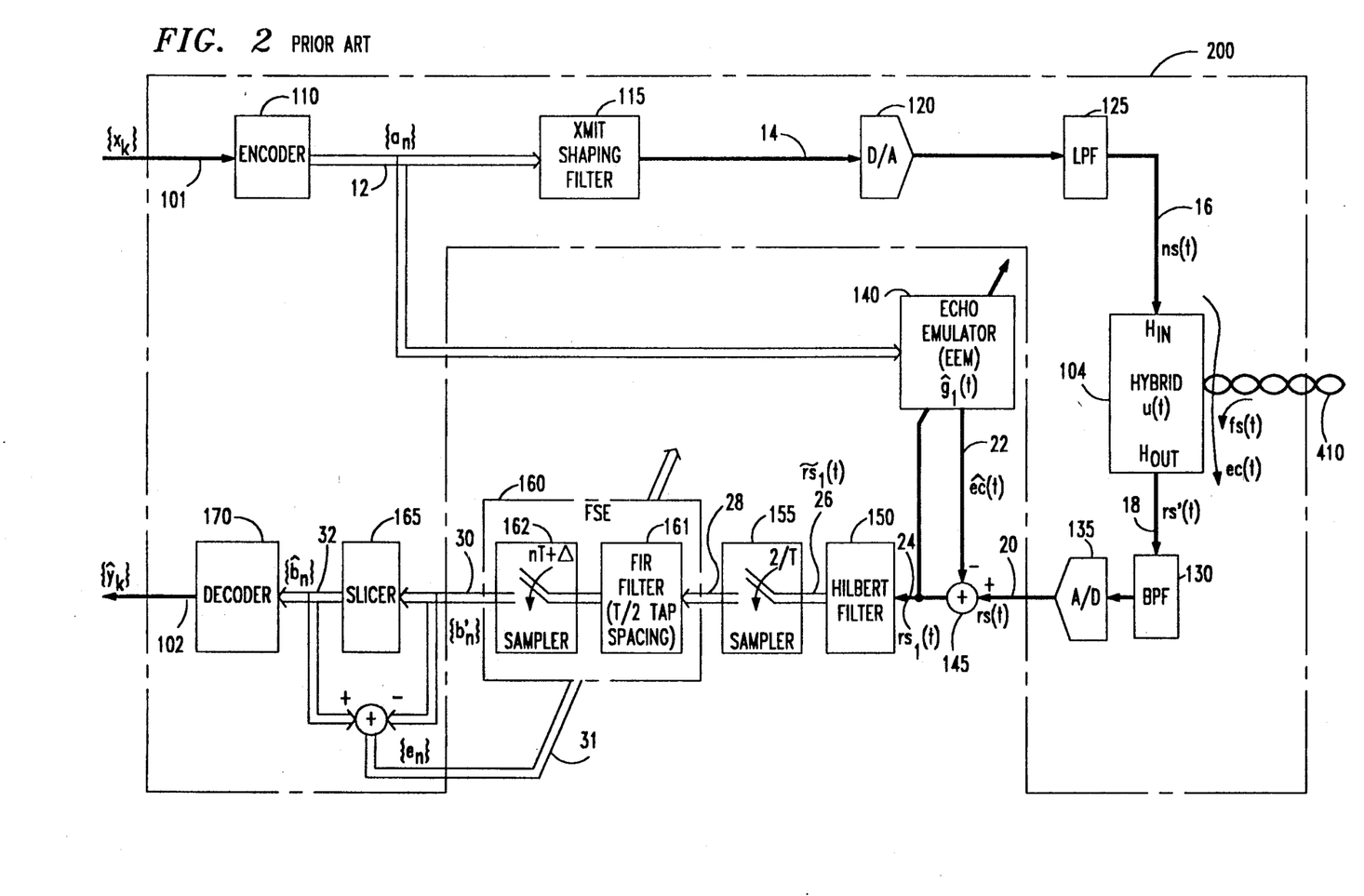
FIG. 2 is a block diagram of a modem structure which illustrates prior-art echo cancellation techniques.
Figure 3:
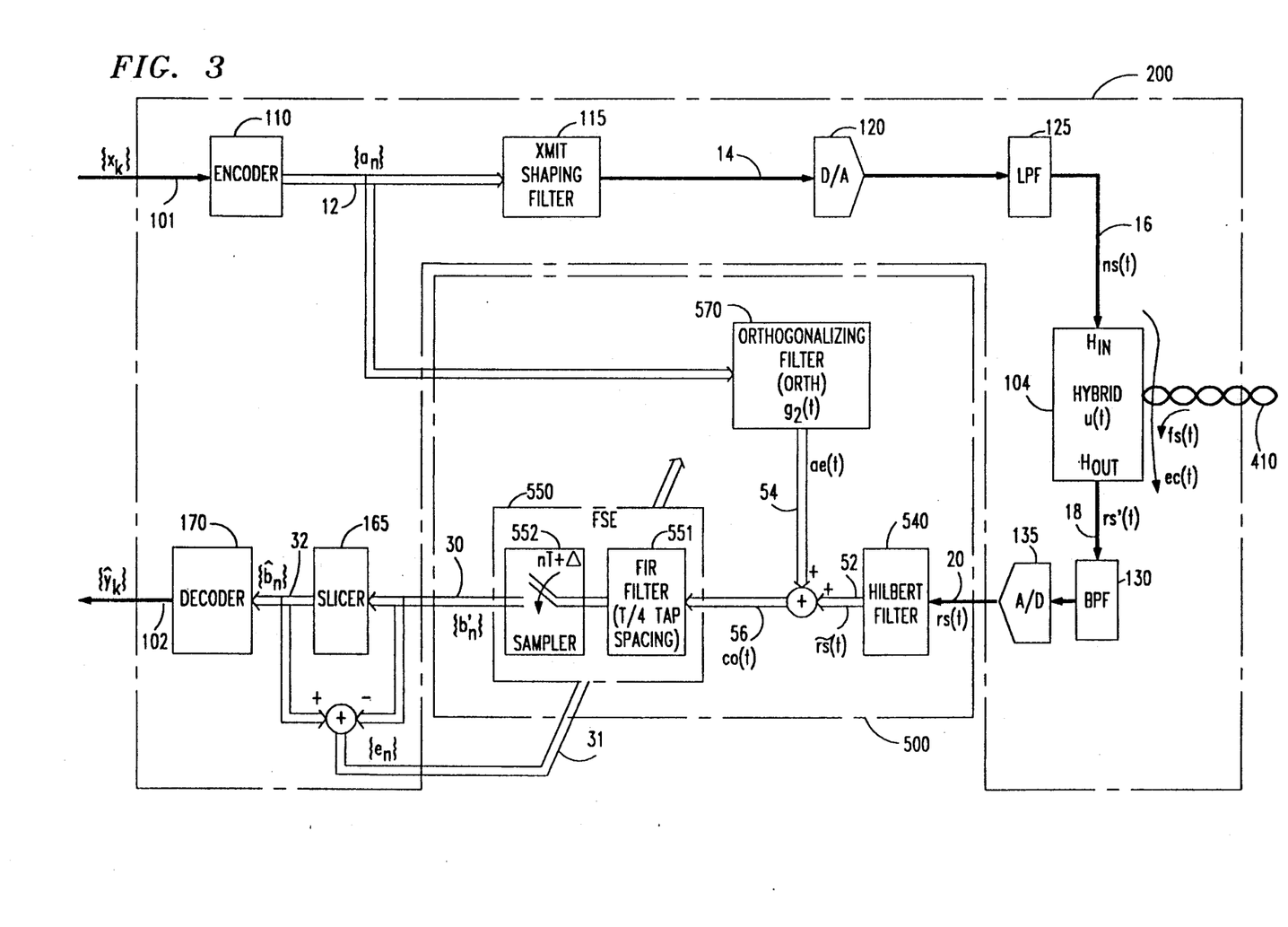
FIG. 3 is a block diagram of an illustrative modem structure embodying the principles of the invention.

The internal processing structure of modem 100 as illustrated in FIG. 2 is representative of prior-art echo cancelling modems. The internal processing structure of modem 100 as illustrated in FIG. 3 is illustrative of the principles embodied in the present invention. A number of components contained within block 200 of both FIG. 2 and FIG. 3 are common to both modem designs. The common components consist of encoder 110, transmit shaping filter 115, digital-to-analog converter 120, lowpass filter 125, hybrid 104, bandpass filter 130, analog to digital (A/D) converter 135, slicer 165, and decoder 170. The operation of these common components is well known; the only slight departure from the commonplace QAM processing in these figures is that we assume, for simplicity in the illustrations, that the transmitted and received signals are processed directly in passband rather than baseband form. We will now briefly review the operation of components common to FIGS. 2 and 3.

The binary input data sequence $\{x_k\}$ to modem 100 is first processed by encoder 110, which outputs a sequence of complex-valued symbols $\{a_n\}$, at nominal rate 1/T symbols per second, which are representative of the input data sequence and may also include scrambling, redundancy and other forms of encoding as well. Symbol sequence $\{a_n\}$ is then processed by transmit shaping filter 115, the output of which is a real-valued passband digital signal. We hereafter assume that filter 115 has excess bandwidth $\alpha$, substantially restricting the energy of its output signal to the positive and negative frequency bands [$f_{min}$, $f_{max}$] Hz, and [$-f_{min}$, $-f_{max}$] Hz respectively, where $$\alpha \equiv \frac{f_{max} - f_{min}}{(1/T)} - 1 \tag{1}$$

and $0 < \alpha < 1$. The aforementioned passband digital signal is converted to analog form by analog-to-digital converter 120, and undesired alias energy is suppressed by low-pass filter 125, forming near-end transmitted signal ns(t).

Hybrid 104 couples transmitted signal ns(t) into loop 410 of channel 400 at input port $H_{IN}$, and simultaneously extracts analog received signal rs'(t) from loop 410, on output port $H_{OUT}$. Ideally, the transfer function u(t) from $H_{IN}$ to $H_{OUT}$ would be zero, so that rs'(t) would consist of solely the far-end signal energy fs(t) due to the transmitter of modem 300. In practice, $u(t) \neq 0$, and consequently rs'(t) = fs(t) + ec(t), where $ec(t) \equiv ns(t) \, u(t)$, and denotes convolution. This undesirable signal ec(t) due to the local transmitter is called 'echo', and it represents a substantial source of interference to the modem receiver, if not mitigated.

(Although we will not discuss it in this example, additional echo signals are typically introduced at each four-to-two wire conversion in the system. The echo source through hybrid 104 as described above is the echo source closest to the transmitter, and is referred to as the 'near echo'. In what follows, it will be appreciated that the invention applies, with suitable modifications, to any echo signal occurring within the system. However, for simplicity, we will consider only the near echo.)

Analog received signal rs'(t) is filtered to remove energy outside the signal passband by bandpass filter 130, and converted to digital form by analog-to-digital converter 135 to form signal rs(t). For purposes of illustration, we will hereafter assume that converter 135 provides digital output samples at rate 4/T samples/second, and that $4/T > 2f_{max}$. Following converter 135, subsequent processing of signal rs(t) in FIGS. 2 and 3 is not common to both figures, until reaching slicer 165. Slicer 165 operates upon the sequence $\{b'_n\}$ emerging from the fractionally spaced equalizer (FSE) in both FIG. 2 and FIG. 3, quantizing the $b'_n$ to form estimated symbol sequence $\{b_n\}$, which feeds decoder 170. Decoder 170 performs symbol-to-bit mapping functions complementary to those of the encoder of far-end modem 300, and in turn yields an estimate $\{\hat{y}_k\}$, of the binary sequence $\{y_k\}$ transmitted by that modem.

At this point, we have described so far only the functional blocks common to both modems of prior-art design and those employing the current invention. The power spectra of the various signals referred to above are illustrated in FIGS. 5–11. Upper-case versions of the aforementioned signals or transfer functions denote frequency domain quantities in the usual manner, e.g. $|NS(f)|^2$ denotes the power spectrum of the signal ns(t), and $|U(f)|$ denotes the transfer function magnitude of u(t).

Figure 5:
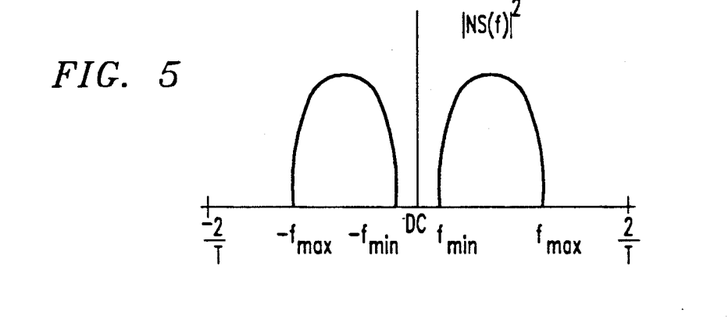
FIGS. 5-14 are illustrative power spectra plots helpful in explaining the operation of prior-art modems and the present invention as illustrated in FIGS. 2 and 3.
Figure 6:
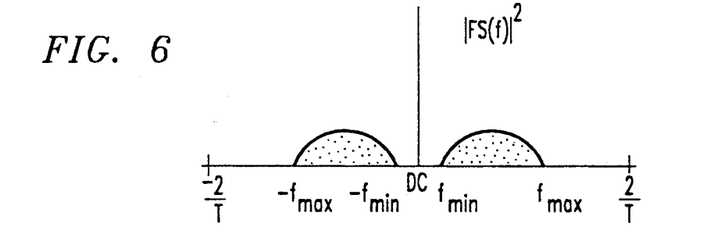
Figure 7:
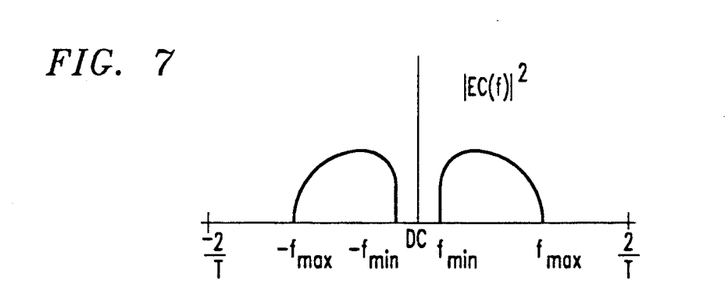
Figure 8:
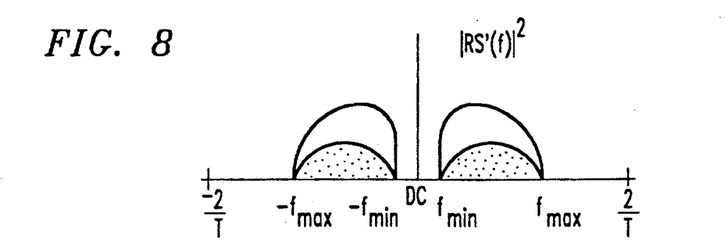
Figure 9:
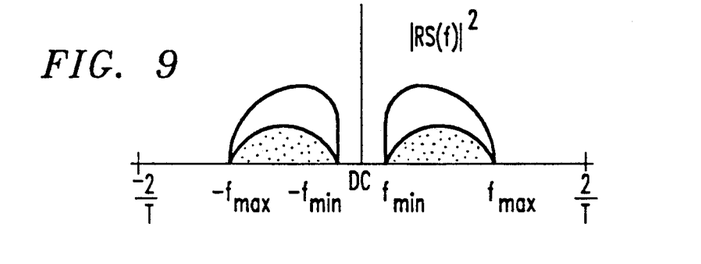

FIG. 5 illustrates the power spectrum of the near-end transmitted signal ns(t) which enters hybrid 104. FIG. 6 shows the power spectrum of far-end signal fs(t) arriving from the far-end modem 300. Note that it occupies the same frequency region as the near-end signal, but is smaller in magnitude, having suffered considerable loss traversing channel 400. FIG. 7 illustrates the power spectrum of echo signal ec(t), that portion of the near-end transmitted signal which 'leaks through' hybrid 104 to become part of the received signal rs'(t). FIG. 8 illustrates the spectral components of signal rs'(t). The unshaded region of FIG. 8 depicts the spectrum of echo signal ec(t), and the shaded region depicts the spectrum of far-end signal fs(t). As is often the case in practice, FIG. 8 shows the near echo as having significantly larger power than the far signal. FIG. 9 illustrates the power spectrum of rs(t), the digital version of rs'(t), over the frequency range [−2/T,2/T], where it will be recalled that 4/T is the A/D converter sampling rate.

We will now briefly describe the operation of the remaining portions of the prior-art echo cancelling modem of FIG. 2, so as to facilitate a contrast of the prior art with the principles of the present invention.

Recall that A/D converter output rs(t) is contaminated with the undesired echo signal ec(t), i.e., $$rs(t) = fs(t) + ec(t) \quad (2a)$$
$$= fs(t) + ns(t) \; u(t). \quad (2b)$$

Figure 10:
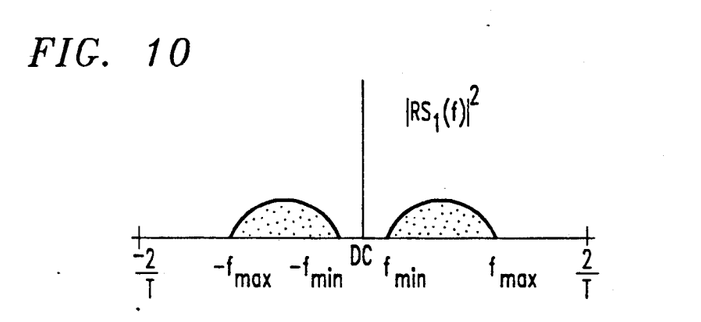

The prior-art modem of FIG. 2 utilizes data-driven echo emulator (EEM) 140, to form an echo estimate, ec(t), which approximates the actual echo signal ec(t) present in received signal rs(t). EEM 140 is essentially a filter whose transfer function is adaptively determined so as to emulate the "echo path", i.e., all filtering operations encountered by the locally transmitted symbols $\{a_n\}$ from transmit filter 115 through A/D converter 135. At adder 145, ec(t) is subtracted from rs(t) so as to produce a substantially echo-free signal $rs_1(t)$, which is then processed by the remainder of the receiver. The power spectrum of $rs_1(t)$ is shown in FIG. 10. Note that the echo signal is no longer shown, since it is assumed to have been reduced to negligible levels by the action of the echo canceller. Thus, $rs_1(t)$ consists primarily of the far-end signal, plus noise introduced by the channel. However, further processing of this signal is still required, primarily to compensate for intersymbol interference (ISI) introduced by the channel.

Figure 11:
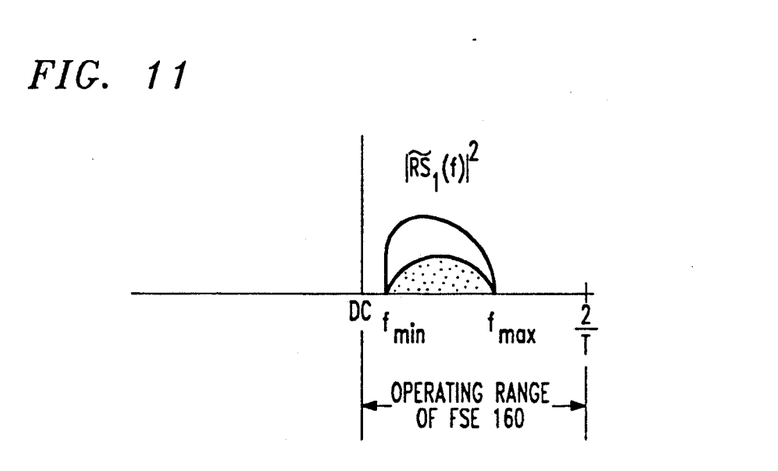

To this end, $rs_1(t)$ enters Hilbert filter 150, which passes only positive frequencies, resulting in the complex-valued "analytic" signal $rs_1(t)$. (The negative- and positive-frequency portions of the received signal are conjugate symmetric, and contain the same information; in QAM receivers, it is common practice to utilize a fixed Hilbert (or "phase-splitting") filter to remove the negative frequency components prior to equalization, performing subsequent signal processing only on the resultant analytic signal.) FIG. 11 shows the power spectrum of analytic signal $rs_1(t)$. Note that $rs_1(t)$ occupies only bandwidth $(1+\alpha)/T$ Hz, where $\alpha$ is the transmitter's excess bandwidth factor, rather than the full sampling bandwidth of 4/T Hz. This fact is commonly exploited by resampling $rs_1(t)$ at some lower rate, say p/T samples/sec, where $p/T > (1+\alpha)/T$, so that subsequent processing requirements are reduced. In this illustrative example, $rs_1$ is resampled by sampler 155 with p=2, and the resultant signal forms the input to adaptive FIR filter 161 of fractionally spaced equalizer 160. The tap coefficients of filter 161 are complex-valued, with spacing T/2. The output of filter 161 is resampled at the symbol rate, at sampling instants n/T+$\Delta$, by sampler 162 to form the sequence $\{b'_n\}$, which proceeds to the slicer and subsequent processing as has been previously described. (The constant $\Delta$ is the overall system delay from the encoder of far-end modem 300 to the output of FSE 160.)

The tap coefficients of FSE 160 are adaptively adjusted so as to minimize the mean-squared error $$MSE \equiv {_n}E\{|e_n|^2\} \quad (3)$$

where "error signal" $e_n$ is defined as $$e_n \equiv b_n - b'_n \quad (4)$$

and $_nE\{.\}$ denotes expectation value over all n.

We now draw attention to the processing arrangement of FIG. 3, illustrating the principles of the invention. Note that the signal processing within block 200 is essentially identical to the prior art modem of FIG. 2 as described above, and will not be repeated here. The operations which embody the principles of the invention are performed within block 500, and will now be described.

The input to block 500 is the digital received signal rs(t), which passes directly into Hilbert filter 540, which substantially removes the negative frequency components of rs(t), resulting in analytic signal rs(t). Recall that the sampling rate of rs(t) is illustratively assumed to be 4/T samples/second. In contrast to the prior art modem of FIG. 2, the output signal rs(t) of Hilbert filter 540 is not resampled to rate 2/T, but remains at rate 4/T. This is because subsequent processing in FIG. 3 utilizes the negative frequency region (i.e., from −2/T to DC) which was 'cleared out' by Hilbert filter 540. Specifically, an additional echo signal, ae(t), derived by filtering transmitted symbols $\{a_n\}$ through fixed (i.e., non-adaptive) "orthogonalizing filter" (ORTH) 570, and which contains substantial energy only at frequencies from −2/T Hz to DC, is added to Hilbert filter output rs(t) to produce a composite signal co(t), which then becomes the input to FSE 550. Adaptive FIR filter 551 of FSE 550 utilizes complex-valued tap coefficients with tap spacing T/4 (rather than T/2 of the FSE 160 of FIG. 2), so that its operating range is [−2/T, 2/T], and thus includes the full bandwidth of composite signal co(t).

Figure 12:
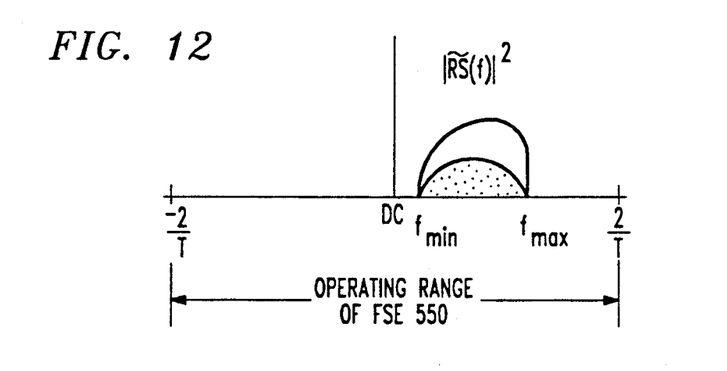
Figure 13:
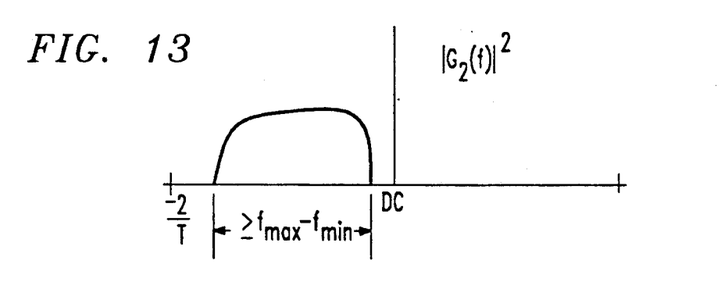
Figure 14:
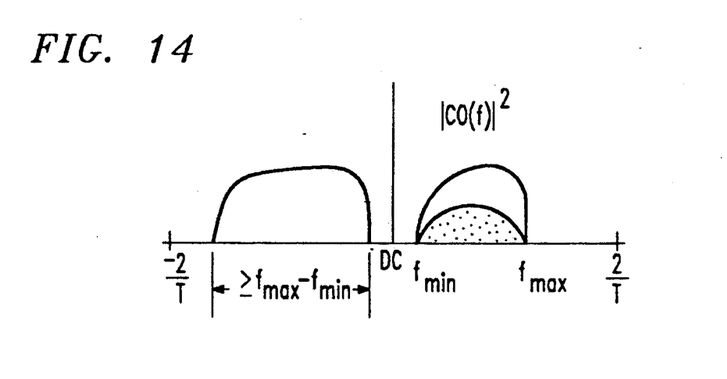

Spectral diagrams of various signals and filters within block 500 are shown in FIGS. 12-14. FIG. 12 shows the spectrum of analytic signal rs(t), and indicates on the frequency axis the [−2/T, 2/T] operating range of the T/4 complex equalizer 550. FIG. 13 shows the transfer function magnitude of orthogonalizing filter 570. FIG. 14 shows the spectrum of composite signal co(t), which includes the additional echo signal ae(t).

Note that in contrast to the situation of the prior-art modem of FIG. 2 in which the echo seen by equalizer 160 is reduced as much as possible, the total echo power of the composite signal 56 seen by FSE 550 of FIG. 3 is actually larger than the original echo ec(t) due to the hybrid mismatch alone. However, also note that the additional echo power introduced through orthogonalizing filter 570 lies outside the passband of the analytic far-end signal, and that operating bandwidth of equalizer 550 includes the bandwidth of this additional echo. If orthogonalizing filter 570 is chosen appropriately, according to criteria described hereinbelow, then FSE 550 will provide a substantially echo-free and ISI-free output sequence $\{b'_n\}$, when adapted in the conventional manner so as to minimize the mean-squared error (3). The mean-squared error so obtained is comparable to the mean-squared error using the prior-art method of FIG. 2.

Thus, in accordance with the invention, I have realized a method and apparatus for processing the received signal so that the echo signal can be mitigated by the FSE itself, without the need for a separate echo canceller. Specifically, by adding to the input signal of the FSE an additional echo signal, having energy outside the frequency range of the FSE's input signal, a composite signal is formed; and by increasing the bandwidth of the fractionally spaced equalizer so as to equalize this composite signal, the echo appearing at the symbol-rate output of the FSE is removed or significantly reduced. Thus, a new receiver structure is proposed, which allows the FSE to simultaneously perform both equalization and echo cancellation.

As this result is somewhat counterintuitive, we will attempt here to explain it qualitatively. A more rigorous treatment is provided subsequently hereinbelow.

Both the far signal and the echo are so-called "cyclostationary" signals. Such cyclostationary signals are formed by convolving a train of T-spaced information-bearing impulses—i.e., their respective symbol sequence—with a linear filter F. In the case of the far signal, filter F is the cascade of the far-end transmit filter and the channel. For the echo signal, filter F is the cascade of the near-end transmit filter and $h(t)$, the transfer function of the hybrid. In any case, the passband of filter F determines the bandwidth of the signal.

The spectra of cyclostationary signals have a certain redundancy, namely that the underlying symbol sequence, i.e., the information content of the signal, can be reconstructed from any 'slice' of the signal's passband which is at least 1/T Hz wide. Loosely speaking, the symbol information within the spectrum is periodic in frequency in the sense that the 'information' at frequency $f_0$ is identical to the 'information' at all baud-spaced "translates" of $f_0$, i.e., $f_0+k/T$, for any integer k, within the passband of the filter.

When such a signal is sampled at T-spaced intervals, e.g., by the sampler at the output of the FSE, the translates are all added together, this is commonly referred to as "spectral folding". However, the adaptive filter portion of the FSE operates on the signal prior to sampling, and can, by adjusting its transfer function, determine whether the folding of its output signal is constructive (i.e., the translates all add in the same direction) or destructive (translates sum to zero.)

In the presence of echo, the FSE sees the sum of two cyclostationary signals: the far signal and the echo. In minimizing the MSE, the FSE will 'automatically' attempt to adjust its transfer function so that at the sampler output, spectral components of the far signal fold constructively, while components of the echo fold to zero, or cancel. However, if the bandwidth of the far signal plus echo is less than twice the symbol rate, then there is insufficient freedom for the FSE to satisfy both requirements simultaneously. This is just the situation in the prior-art modem: The echo and far signal (at the FSE input) occupy a band which is nominally $(1+\alpha)/T$ Hz wide, where $\alpha < 1$. This explains why, in the prior-art modem, the FSE cannot be depended upon to cancel the echo, and it must therefore be mitigated by other means.

However, in the present invention, enlarging the bandwidth of the FSE's filter and adding additional echo in a spectral region which does not overlap the far signal, provides the additional degrees of freedom necessary for the FSE to solve both folding requirements simultaneously. In effect, the additional echo energy provides a extra 'slice' of the echo spectrum which the FSE can operate on with complete freedom, since it is does not overlap the spectrum of the received signal. When folding occurs, upon sampling the FSE filter output, the equalized spectral components from the additional-echo region can thus efficiently cancel the original components present in the positive passband, resulting in very little residual echo in the output samples.

There are a few general considerations with regard to the design of the orthogonalizing filter ORTH which are important to the proper functioning of the invention. In describing these considerations below, the illustrative structure of FIG. 3 is assumed. We use $g_1(t)$ to denote the overall impulse responses of the echo path (i.e., from the input of transmit shaping filter 115 through Hilbert filter 540), and $g_2(t)$ to denote the impulse response of orthogonalizing filter ORTH. Correspondingly, $G_1(f)$ and $G_2(f)$ denote Fourier transforms of $g_1(t)$ and $g_2(t)$.

The passband of $G_2(f)$ may be located anywhere below DC; however it must be at least $(1+\alpha)/T$ wide. The stopband should allow relatively little energy into positive-frequency passband.

The overall gain setting for $G_2(f)$ determines the power of additional echo signal $ae(t)$, which in turn determines the gain which FSE 550 must realize in the region below DC in order to properly cancel the echo: The higher the gain of $ae(t)$, the smaller the FSE response required below DC. Consequently, a primary consideration in determining the gain of $G_2(f)$ will be the imageband (i.e., negative frequency) attenuation of Hilbert filter 540. This is because the incompletely suppressed imageband alias from the received signal effectively represents a noise source, which will be enhanced to an unacceptable level if the FSE negative-frequency gain is too large.

The group delay of $g_2(t)$ should be approximately the same as the group delay of echo path $g_1(t)$. More specifically, the group delay of $g_1(t)+g_2(t)$ should be less than time span of FSE 550. For example, when using the invention to mitigate an echo signal with long delay, then ORTH may advantageously be implemented as a bulk delay followed by the actual filter.

Some of the advantages of the present invention versus the prior art include the following:

i. Although the FSE used in the prior-art modem requires less computational power, by virtue of its lower sampling rate, than the wider-band FSE used in the present invention, the overall realtime computational requirement of the new structure may nevertheless be smaller than the prior-art structure, depending on other system parameters. This is primarily because orthogonalizing filter ORTH is of considerably lower complexity than the prior-art echo emulator EEM.

ii. The new structure consolidates both both echo cancellation and equalization into a single adaptive element, as opposed to the two separate adaptive elements required in the prior-art structure. This can be advantageous in that it simplifies or avoids problems related to or caused by interaction of the adaptive elements within the prior-art system.

iii. The new structure utilizes equalized errors $e_n$ to adapt its FSE. Once the FSE has adapted sufficiently that the residual ISI is small, the $e_n$ will not contain any substantial component of the far signal. This allows the use of larger adaptation stepsizes than the prior-art structure of FIG. 2, and permits, to some degree, the tracking of important nonstationary phenomena such as timing- and carrier-frequency offset. (An example is presented hereinbelow.)

Figure 4:
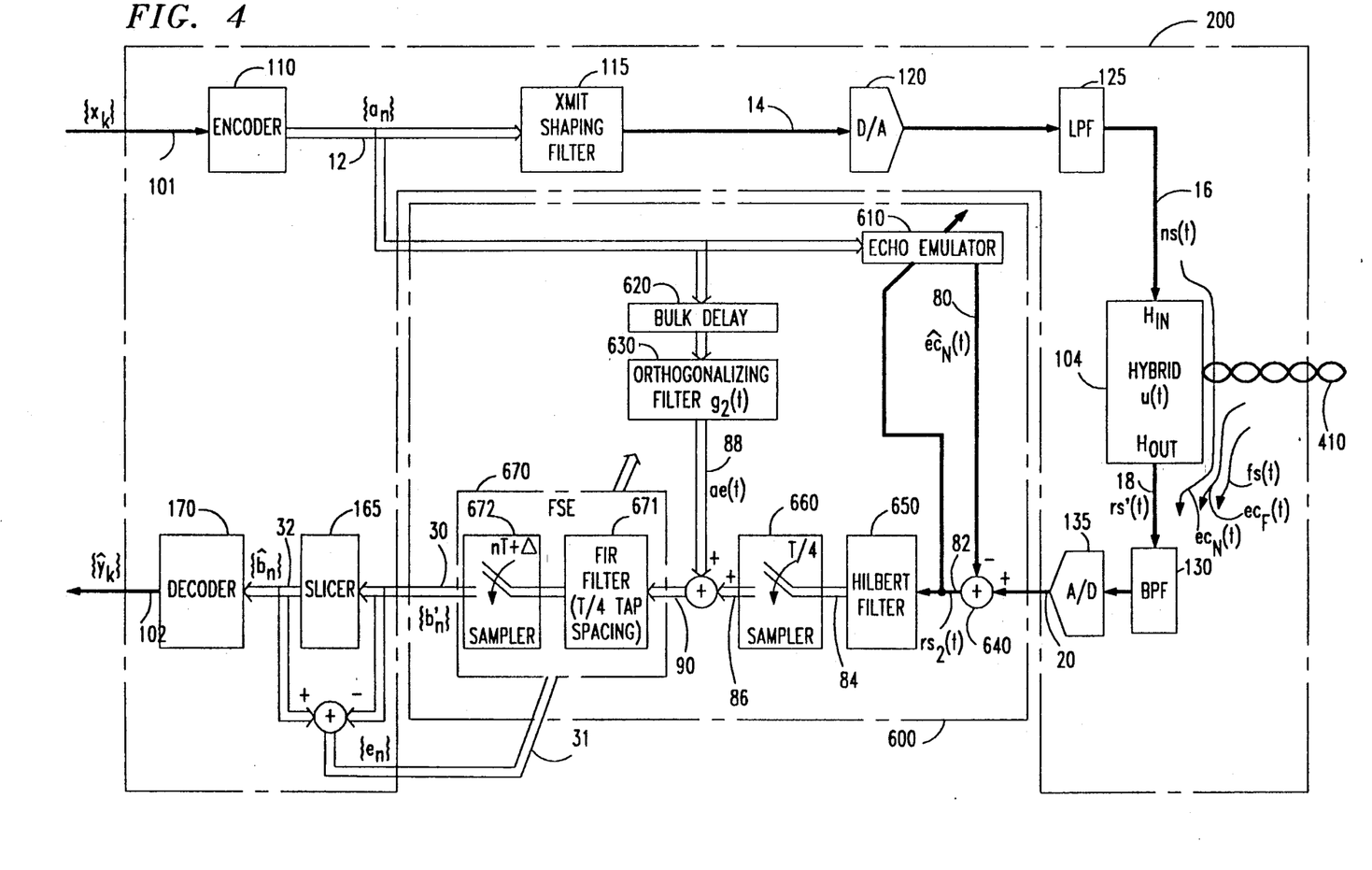
FIG. 4 is a block diagram of a modem structure which advantageously combines the techniques of the invention with aspects of prior-art echo cancellation.

The invention may also be advantageously combined with various prior-art in numerous ways, one of which is shown in FIG. 4, illustratively intended for use on a PSTN channel. Recall that up to this point, the discussion had assumed that only one echo, the near echo, is present in the received signal. The near echo path is relatively short, and introduces no carrier-frequency offset whatsoever. Typically, however, a "far echo" is also present in PSTN channels. The far echo path can be quite long, and may introduce frequency offset as well. The power of the far echo is usually less than the power of the far signal, whereas the near echo is usually quite a bit larger than the far signal.

In the prior-art, the dual-echo problem is frequently attacked by incorporating two echo emulators, one for the near echo, and one for the far echo. The far emulator is more complex in many respects than the near emulator, primarily because there may be frequency offset in the far echo, and because the far echo is usually 'buried' underneath the far signal. This power differential limits the stepsize that can be used with the far canceller to such a small value that frequency offset can not be tracked, and additional complexity is required. Furthermore, the small stepsize results in relatively long convergence times.

The structure of FIG. 4 attacks the problem of dual echoes using a combination of the present invention and the prior art. The received signal here is the sum of far signal fs(t), near echo $ec_N(t)$, and far echo $ec_F(t)$. Echo emulator 610 forms an estimate, $\hat{ec}_N$, of near echo $ec_N$, and this is subtracted from the received signal, leaving signal $rs_2(t)$, which is substantially free of near echo. The remainder of the receiver operates on $rs_2(t)$ in accordance with the invention, and the FSE cancels the far echo signal. (In FIG. 4, orthogonalizing filter 630 is preceded by bulk delay 620 so as to approximate the group delay of the far echo path.)

The structure of FIG. 4 combines advantages from both the invention of FIG. 3 and the prior-art of FIG. 2. First, with regard to the prior-art structure, it has the aforementioned advantage that the stepsize of the FSE can be made large enough to track significant carrier-frequency offset in the far echo, without undue adaptation noise, and to converge rapidly as well.

An additional advantage of the structure of FIG. 4, relative to that of FIG. 3, is that the powerful near echo signal is eliminated early on in the receiver, significantly reducing the dynamic range of signals seen by the remainder of the receiver. It also allows a simpler Hilbert filter than would be required in FIG. 3, since the the stopband attenuation requirement in the negative frequency region can be relaxed.

We will now briefly present the theory underlying the invention in more detail. In what follows, we make some common simplifying assumptions, not always explicit, in order to keep the presentation as concise as possible.

Figure 15:
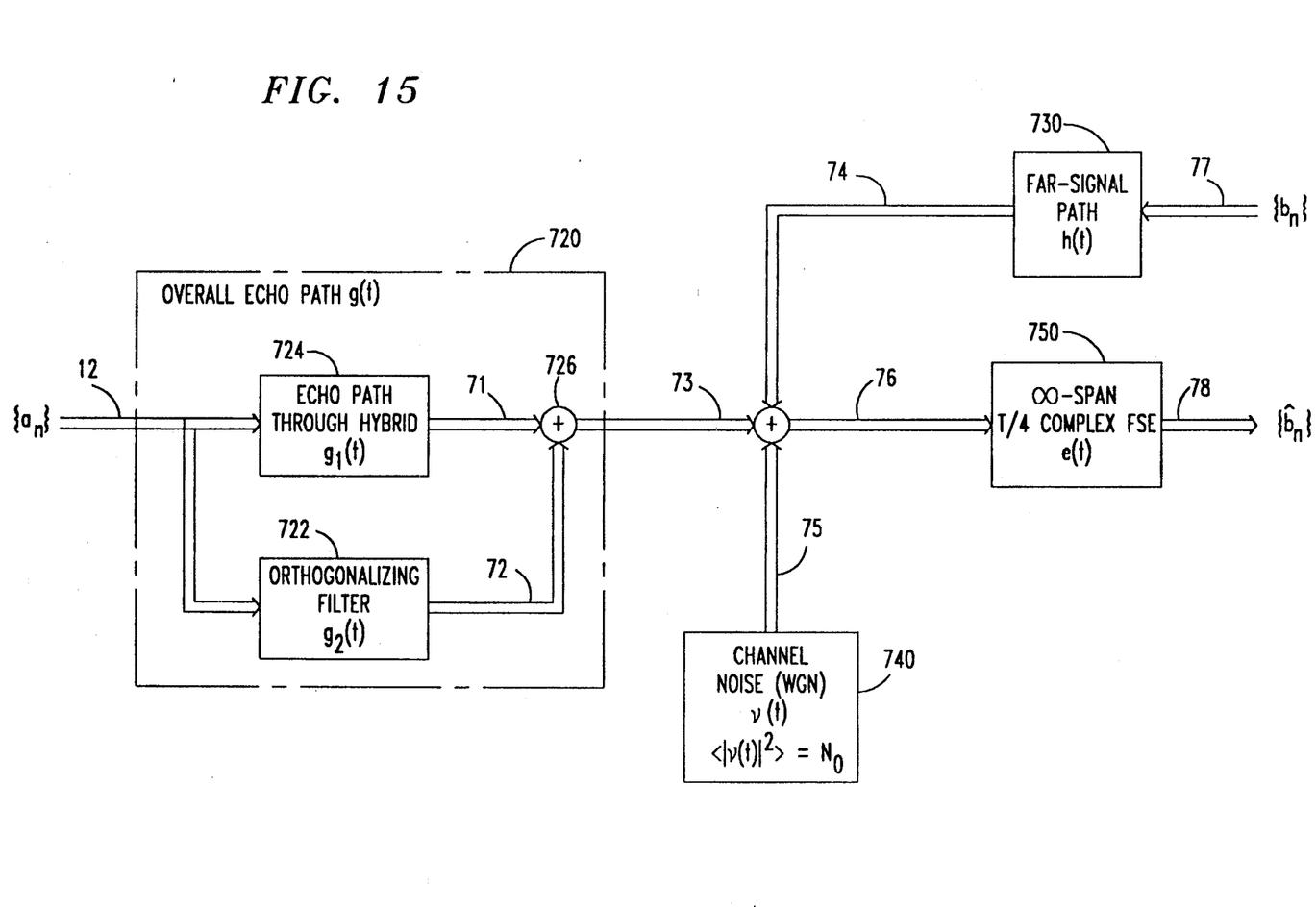
FIG. 15 is a block diagram used in presenting the detailed theory of operation of the invention.

Refer to diagram FIG. 15, which shows only the essential filtering operations performed on the symbols sequences in the system of FIG. 2. Filter 730 represents the 'far-signal path', i.e., h(t) is the composite impulse response of all filtering performed on far-end symbol sequence $\{b_n\}$ prior to FSE 750. Filter 720 likewise represents the overall echo path, i.e., g(t) is the composite response of all filtering performed on the near-end symbol sequence $\{a_n\}$ prior to the FSE. Note that $g(t)=g_1(t)+g_2(t)$, where $g_1(t)$ is the undesired echo path through the hybrid, and $g_2(t)$ is the 'additional echo' path through the orthogonalizing filter. All impulse responses are complex-valued. FSE 750 is modeled as an infinite-span FIR filter with T/4-spaced complex tap coefficients, and with output samples $b'_n$ provided at times $nT+\Delta$. Channel noise v(t) is modeled as an additive white Gaussian source, with power spectral density $N_0$.

In the context of FIG. 15, the $b'_n$ will be free of intersymbol interference iff $$[h(t) \; e(t)] \cdot \sum_{n=-\infty}^{\infty} \delta[t - (nT + \Delta)] = \delta(t - \Delta), \quad (5)$$

where $\delta(\cdot)$ denotes the Kronecker delta. This is the well known 'Nyquist I' criterion. It is not hard to show that for a given equalizer setting e(t), the mean-squared intersymbol interference at the FSE output is just the squared difference between the left- and right-hand sides of (5) over all n, i.e., $$MSE_{isi} = \qquad (6)$$

$$\int_{-\infty}^{\infty} \left| [h(t) \; e(t)] \cdot \sum_{n=-\infty}^{\infty} \delta[t - (nT + \Delta)] - \delta(t - \Delta) \right|^2 dt.$$

Similarly, in order for the FSE output samples $b'_n$ to be free of echo, the so-called "generalized Nyquist criterion" (e.g., "A Generalized Nyquist Criterion and an Optimum Linear Receiver for a Pulse Modulation System", D. A. Shnidman, *The Bell System Technical Journal*, November 1967) requires that $$[g(t) \; e(t)] \cdot \sum_{n=-\infty}^{\infty} \delta[t - (nT + \Delta)] = 0. \quad (7)$$

In analogy with (5) and (6), the mean-squared echo at the FSE output is $$MSE_{echo} = \int_{-\infty}^{\infty} \left| [g(t) \; e(t)] \cdot \sum_{n=-\infty}^{\infty} \delta[t - (nT + \Delta)] \right|^2 dt. \quad (8)$$

The MSE due to noise is $$MSE_{noise} = N_0 \int_{-\infty}^{\infty} |e(t)|^2 dt. \quad (9)$$

Assuming, without loss of generality, that $\Delta=0$, and taking appropriate Fourier transforms of (6), (8) and (9), the total mean-squared error can be expressed compactly in frequency domain as $$MSE_{tot} = \qquad (10)$$

$$\int_0^{1/T} |h^*e - 1|^2 d\zeta + \int_0^{1/T} |g^*e|^2 d\zeta + \int_0^{1/T} \|e\|^2 d\zeta$$

where vectors h, g, and e are understood to be functions of $\zeta$, specifically $$h(\zeta) \equiv [H(\zeta - 2/T), H(\zeta - 1/T), H(\zeta), H(\zeta + 1/T)]^* \quad (11a)$$

$$g(\zeta) \equiv [G(\zeta - 2/T), G(\zeta - 1/T), G(\zeta), G(\zeta + 1/T)]^* \quad (11b)$$

$$e(\zeta) \equiv [E(\zeta - 2/T), E(\zeta - 1/T), E(\zeta), E(\zeta + 1/T)]^*, \quad (11c)$$

overbar denotes conjugate, superscript * denotes conjugate transpose, and $\zeta$ is a frequency variable which ranges only over the interval [0, 1/T].

After considerable manipulation, the form of the optimum equalizer setting (the one which minimizes MSE$_{tot}$) can be derived, and it can further be shown that the corresponding minimized mean-squared error MSE$_0$ is $$MSE_0 = \int_0^{1/T} \frac{d\zeta}{1 + \mu_0(\zeta) - \rho(\zeta)} \quad (12)$$

where $$\rho(\zeta) = \frac{|g^*h|^2/N_0}{N_0 + \|g\|^2} \quad (13)$$

and $\mu_0(\zeta)$ is the familiar 'folded signal-to-noise ratio' at the receiver input, i.e., $$\mu_0(\zeta) = \frac{1}{N_0} \sum_k |H(\zeta + k/T)|^2. \quad (14)$$

Note that if $\rho(\zeta)=0$, then (12) is equivalent to the classical expression for the minimized MSE in the absence of echo. In effect then, $\rho(\zeta)$ represents a downward 'correction' to the folded SNR, due to the presence of the echo signal.

From its definition (13), it can be seen that $\rho(\zeta)$ is a normalized measure of the orthogonality of g and h: If g and h are orthogonal $\zeta\epsilon[0, 1/T]$, then $\rho(\zeta)=0$, and the FSE completely eliminates the echo. Conversely, if g and h are far from orthogonal, over some nontrivial range of $\zeta$, then the echo significantly degrades the MSE.

Consider the form of g and h when $g_2(t)=0$. Since the far signal and echo occupy essentially the same band, and since $\alpha$ is assumed to be small, it can be seen that g and h are collinear (or nearly so) over most of the range of $\zeta$. For a given $\zeta$, g and h both have just one large element, and in the same location within the vector, e.g.

$$(\epsilon,\epsilon,\mu,\epsilon) \quad (15)$$

where $\mu$ represents the appropriate transfer function at frequency $\zeta$, and $|\mu| >> |\epsilon|$.

Now consider what recourse is available if we have the freedom to modify g. It is easy to see that if g can be 'adjusted' so that it has a form like $$(\mu',\epsilon,\mu,\epsilon) \quad (16)$$

while h remains like (15), then $p(\zeta)$ tends to zero as $|\mu'|$ increases, since the numerator of (13) remains relatively constant while the denominator increases.

This is exactly what orthogonalizing filter $g_2(t)$ provides. By injecting echo energy into the negative frequency region over a bandwidth of at least $(1+\alpha)/T$ Hz, the orthogonalizing filter insures that g has the general form of (16) (or an equivalently orthogonal form) for all $\zeta\epsilon[0,1/T]$. However, it is not necessary to make $|\mu'|$ (i.e., $|G_2(f)|$, $f>0$) extremely large in order to obtain acceptable MSE$_{tot}$. As long as $\mu_0(\zeta)>>1$, as is typically the case in practice, it can be seen from (12) that even relatively small reductions in $p(\zeta)$ can produce significant improvements in MSE$_{tot}$.

The foregoing merely illustrates the principles of the invention and it will be appreciated that those skilled in the art will be able to devise numerous arrangements which, although not explicitly disclosed herein, embody the principles of the invention. For example, multiple echoes may be cancelled by utilizing several orthogonalizing filters in parallel with different bulk delays; the invention can be implemented using alternative forms of fractionally spaced equalizers, e.g. FSE's which operate directly on the realvalued received signal rather than the analytic received signal; a decision-feedback equalizer which utilizes a fractionally spaced feedforward filter can be used with the invention; and the invention may be advantageously combined with the prior art canceller in ways other than that shown in FIG. 4, while still embodying the principles of the invention. Also, although the invention is illustrated herein as being implemented with discrete functional building blocks, e.g. orthogonalizing filter, fractionally spaced equalizer, etc., the functions of any one or more of those building blocks can be carried out using one or more appropriate programmable processors, digital signal processing (DSP) chips, etc. Further, it is not necessary to place the additional echo in the negative frequency region—any substantially 'empty' region within FSE's band of operation can be used, provided its width is somewhat greater than $(1+\alpha)/T$. In addition, the invention may be used with other modulations schemes including, for example, PAM, PSK and other angle-modulation schemes. Finally, although the invention is illustrated in the context of a voice-grade data communications system, it is equally applicable to other systems, for example in so-called digital subscriber loop (DSL) applications.

I claim:

1. A method for processing a received signal, the received signal being comprised of a far-end signal and an echo signal, the far-end signal representing a sequence of far-end signal values occurring at T second intervals in a first frequency range, and the echo signal being comprised of energy from a near-end signal, the near-end signal representing a sequence of near-end signal values occurring at T second intervals in the first frequency range, the method comprising the steps of:

processing the sequence of near-end signal values to provide an additional echo signal in a second frequency outside of the first frequency range;

combining the received signal and the additional echo signal to provide a composite signal; and equalizing the composite signal with a fractionally spaced equalizer operative over the first and second frequency ranges, whereby the effect of the echo signal is mitigated.

2. The method of claim 1 wherein the echo signal is a near echo signal.

3. The method of claim 1 wherein the echo signal is comprised of a near echo signal and a far echo signal.

4. The method of claim 3 wherein the step of processing the sequence of near-end signal values includes the steps of:

processing the sequence of near-end signal values to provide an estimate of the near echo signal; and processing the sequence of near-end signal values to provide an additional far echo signal in the second frequency range outside of the first frequency range.

5. The method of claim 4 wherein the step of processing the sequence of near-end signal values to provide an additional far echo signal includes the steps of:
  delaying the sequence of near-end signal values to provide a delayed near-end signal where the delay approximates a group delay of the far echo path; and
  filtering the delayed near-end signal with an orthogonalizing filter.

6. The method of claim 4 wherein the step of combining includes the steps of:
  subtracting the estimate of the near echo signal from the received signal to provide a signal substantially free of near echo; and
  adding the additional far echo signal to the signal substantially free of near echo to provide the composite signal.

7. A method for use in a single channel, full-duplex, communication system, the method comprising the steps of:
  conditioning a data signal to provide a near-end signal, the data signal representing a sequence of data signal values occurring at T second intervals in a first frequency range;
  coupling to the channel for transmitting the near-end signal on the channel, for receiving a far-end signal from the channel, and to provide a received signal, the far-end signal representing a sequence of far-end signal values occurring at T second intervals in the first frequency range, the received signal being comprised of the far-end signal and an echo signal, the echo signal being comprised of a fraction of the energy of the near-end signal;
  processing the received signal to provide an output signal in the first frequency range;
  processing the data signal to provide an additional echo signal in a second frequency range outside of the first frequency range;
  combining the output signal and the additional echo signal to provide a composite signal; and
  equalizing the composite signal with a fractionally spaced equalizer operative over the first frequency range and the second frequency range, whereby the effect of the echo signal is mitigated.

8. The method of claim 7 wherein the step of processing the received signal includes the steps of:
  sampling the received signal to provide a sampled signal, the sampled signal being comprised of a succession of samples occurring at a predetermined rate of p/T samples per second, p>1, the sampled signal being comprised in the frequency domain of periodic replicas of the received signal distributed in a plurality of frequency bands; and
  filtering the sampled signal to provide the output signal.

9. The method of claim 8 wherein the step of filtering includes the step of filtering the sampled signal with a Hilbert filter.

10. The method claim 7 wherein the step of processing the data signal includes the step of filtering the data signal with an orthogonalizing filter.

11. The method of claim 7 wherein the echo signal is the near echo signal.

12. The method of claim 7 wherein the echo signal is comprised of a near echo signal and a far echo signal.

13. The method of claim 12 wherein the step of processing the data signal includes the steps of:
  processing the data signal to provide an estimate of the near echo signal; and
  processing the data signal to provide an additional far echo signal in a second frequency range outside of the first frequency range.

14. The method of claim 13 wherein the step of processing the data signal to provide an additional far echo signal includes the steps of:
  delaying the data signal to provide a delayed signal where the delay approximates a group delay of the far echo path; and
  filtering the delayed signal with an orthogonalizing filter.

15. The method of claim 13 wherein the step of combining includes the steps of:
  subtracting the estimate of the near echo signal from the output signal to provide a resultant signal substantially free of near echo; and
  adding the additional far echo signal to the resultant signal substantially free of near echo to provide the composite signal.

16. Apparatus for processing a received signal, the received signal being comprised of a far-end signal and an echo signal, the far-end signal representing a sequence of far-end signal values occurring at T second intervals in a first frequency range, and the echo signal being comprised of energy from a near-end signal, the near-end signal representing a sequence of near-end signal values occurring at T second intervals in the first frequency range, the apparatus being comprised of:
  means for processing the sequence of near-end signal values to provide an additional echo signal in a second frequency range outside of the first frequency range;
  means for combining the received signal and the additional echo signal to provide a composite signal; and
  fractionally spaced equalizer means operative over the first and second frequency range for equalization of the composite signal, whereby the effect of the echo signal is mitigated.

17. The apparatus of claim 16 wherein the echo signal is a near echo signal.

18. The apparatus of claim 16 wherein the echo signal is comprised of a near echo signal and a far echo signal.

19. The apparatus of claim 18 wherein the means for processing the sequence of near-end signal values is comprised of:
  first means for processing the sequence of near-end signal values to provide an estimate of the near echo signal; and
  second means for processing the sequence of near-end signal values to provide an additional far echo signal in the second frequency range outside of the first frequency range.

20. The apparatus of claim 19 wherein the means for processing the sequence of near-end signal values to provide an additional far echo signal is comprised of:
  means for delaying the sequence of near-end signal values to provide a delayed near-end signal where the delay approximates a group delay of the far echo path; and
  means for filtering the delayed near-end signal with an orthogonalizing filter.

21. The apparatus of claim 19 wherein the means for combining is comprised of:

means for subtracting the estimate of the near echo signal from the received signal to provide a signal substantially free of near echo; and means for adding the additional far echo signal to the signal substantially free of near echo to provide the composite signal.

22. Apparatus for use in a single channel, full-duplex, communication system, the apparatus being comprised of:

means for conditioning a data signal to provide a near-end signal, the data signal representing a sequence of data signal values occurring at T second intervals in a first frequency range;

means for coupling to the channel for transmitting the near-end signal on the channel, for receiving a far-end signal from the channel, and to provide a received signal, the far-end signal representing a sequence of far-end signal values occurring at T second intervals in the first frequency range, the received signal being comprised of the far-end signal and an echo signal, the echo signal being comprised of a fraction of the energy of the near-end signal;

means for processing the received signal to provide an output signal in the first frequency range;

means for processing the data signal to provide an additional echo signal in a second frequency range outside of the first frequency range;

means for combining the output signal and the additional echo signal to provide a composite signal; and fractionally spaced equalizer means operative over the first frequency range and the second frequency range for equalization of the composite signal, whereby the effect of the echo signal is mitigated.

23. The apparatus of claim 22 wherein the means for processing the received signal is further comprised of:

means for sampling the received signal to provide a sampled signal, the sampled signal being comprised of a succession of samples occurring at a predetermined rate of p/T samples per second, p>1, the sampled signal being comprised in the frequency domain of periodic replicas of the received signal distributed in a plurality of frequency bands; and means for filtering the sampled signal to provide the output signal.

24. The apparatus of claim 23 wherein the means for filtering is a Hilbert filter.

25. The apparatus of claim 22 wherein the means for processing the data signal is further comprised of an orthogonalizing filter.

26. The apparatus of claim 22 wherein the echo signal is the near echo signal.

27. The apparatus of claim 22 wherein the echo signal is comprised of a near echo signal and a far echo signal.

28. The apparatus of claim 27 wherein the means for processing the data signal is comprised of:

first means for processing the data signal to provide an estimate of the near echo signal; and second means for processing the data signal to provide an additional far echo signal in the second frequency range outside of the first frequency range.

29. The apparatus of claim 28 wherein the second means for processing the data signal to provide an additional far echo signal is comprised of:

means for delaying the data signal to provide a delayed signal where the delay approximates a group delay of the far echo path; and means for filtering the delayed signal with an orthogonalizing filter.

30. The apparatus of claim 28 wherein the means for combining is comprised of:

means for subtracting the estimate of the near echo signal from the output signal to provide a resultant signal substantially free of near echo; and means for adding the additional far echo signal to the resultant signal substantially free of near echo to provide the composite signal.

* * * * *